United States Patent [19]
Lupinski et al.

[11] Patent Number: 5,534,602
[45] Date of Patent: * Jul. 9, 1996

[54] HIGH TEMPERATURE POLYETHER IMIDE COMPOSITIONS AND METHOD FOR MAKING

[75] Inventors: John H. Lupinski; Herbert S. Cole, Jr., both of Scotia, N.Y.

[73] Assignee: General Electric Company, Schenectady, N.Y.

[ * ] Notice: The portion of the term of this patent subsequent to Dec. 2, 2013, has been disclaimed.

[21] Appl. No.: 47,531

[22] Filed: Apr. 19, 1993

Related U.S. Application Data

[63] Continuation of Ser. No. 546,964, Jul. 2, 1990, abandoned.

[51] Int. Cl.$^6$ .................................................. C08L 77/00
[52] U.S. Cl. ................................. 525/432; 525/436
[58] Field of Search ..................... 525/436, 432

[56] References Cited

U.S. PATENT DOCUMENTS

| | | | |
|---|---|---|---|
| 4,468,506 | 8/1994 | Holub et al. | 525/432 |
| 4,565,858 | 1/1986 | Klopfer | 528/172 |
| 4,795,680 | 1/1989 | Rich et al. | 428/450 |
| 4,820,781 | 4/1989 | Policastro et al. | 525/431 |
| 4,826,916 | 5/1989 | Policastro et al. | 524/755 |
| 4,965,337 | 10/1990 | Peters et al. | 528/353 |
| 5,047,487 | 9/1991 | Camargo et al. | 525/432 |
| 5,106,915 | 4/1992 | Rock et al. | 525/431 |

OTHER PUBLICATIONS

C. W. Eichelberger et al., High-density Interconnects for Electronic Packaging, SPIE, vol. 877, Micro-Optoelectronic Materials, pp. 90–91, (1988).

Probimide TM 200 Series, Soluble Polyimides for Microelectronics, Ciba–Geigy Corp., Plastics and Additives Division, Hawthorne, NY.

*Primary Examiner*—Marion E. McCamish
*Attorney, Agent, or Firm*—William H. Pittman

[57] ABSTRACT

Polyetherimide compositions are provided having condensed bis (4-aminophenyl) sulfone units, diaminophenylindane units or a mixture thereof. These polyetherimides compositions have been found useful for making high temperature chip adhesives, laminating adhesives and film adhesives for high density interconnects in electronic circuitry.

1 Claim, No Drawings

HIGH TEMPERATURE POLYETHER IMIDE COMPOSITIONS AND METHOD FOR MAKING

CROSS REFERENCE TO PARENT APPLICATION

This application is a continuation of application Ser. No. 07/546,964, filed Jul. 2, 1990, now abandoned.

CROSS REFERENCE TO RELATED APPLICATION

Reference is also made to applications Ser. No. 07/303,988, now U.S. Pat. No. 4,965,337; Ser. No. 07/546,963, now U.S. Pat. No. 5,157,589; and Ser. No. 07/546,965, now U.S. Pat. No. 5,338,975.

BACKGROUND OF THE INVENTION

The present invention relates to the employment of solutions or uniform blends of polyimide having condensed units selected from,

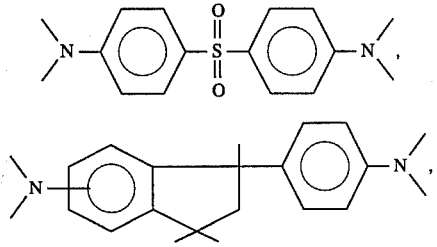

a mixture thereof, referred to hereinafter as "SDAN" units or bis(4-aminophenylsulfonyl) units and "DAPI" units, or diaminophenylindane units. More particularly, the present invention relates to certain polyimide compositions useful for providing chip adhesives, or laminating or film adhesives for making multi-chip high density interconnect (HDI) integrated circuit packaging configurations.

Prior to the present invention as shown by Eichelberger et al, U.S. Pat. No. 4,783,695, various resins, such as Ultem® polyetherimide and epoxy resins were used to bond chips to various substrate, such as ceramic, alumina, metal, glass or plastic. In this HDI approach, successive layers of dielectric and patterned metal are fabricated over the bare chips on a ceramic substrate to provide a completed electronic device. In addition to bonding chips, thermoplastic adhesives have been used to bond films, such as Kapton® resin to the applied chips.

When fabricating HDI configurations, polymers with different Tg's or softening points are required, because the temperature for bonding films over the substrate and chips must be kept below the Tg of the chip adhesive to prevent inadvertent chip movement during manufacture. Other important characteristics needed by polymers used in HDI applications are good adhesion to electronic components and metal, appropriate optical absorption for laser fabrication of via holes, and the ability to be easily removed.

In U.S. Pat. No. 4,820,781, Policastro et al, blends of silicone copolymer and polyetherimide are shown having Tg's in the range from about 190° C. to 210° C. Additional silicone polyimides and polyimide siloxanes are shown by Policastro et al, U.S. Pat. No. 4,826,916 and U.S. Pat. No. 4,795,680 incorporated herein by reference which are useful as coating materials in electronic applications, or as dielectric or passivating layers in semiconductor devices.

Although, Ultem® polyetherimide having a Tg of 217° C. has been found useful for fabricating multi-chip integrated circuits, thermoplastic resins with higher Tg's, such as 220° C. to 320° C. are constantly being sought to avoid inadvertent chip and/or film removal when repairing such HDI electronic packaging.

Even though polyimides having Tg's as high as 320° C. are available in the construction of HDI circuitry, they must be applied as a solution. Phenolic solvents can be used in particular instances, but their use is limited due to their acidic properties which halve a deleterious effect on the delicate circuit components. As a result, the need exists for additional resins having appropriate physical, electrical and chemical characteristics for use in electronic packaging.

SUMMARY OF THE INVENTION

The present invention is based on the discovery that phenolic-free coating compositions comprising polyimide having condensed biphenol dianhydride units (BPDA), and SDAN units, or uniform blends of BPDA-SDAN polyimide and polyetherimide having condensed bisphenol A dianhydride (BPADA) units and SDAN units, can provide chip adhesives having single Tg's in the range of 250° C. to 270° C. which are composition dependent. In addition, laminating or film adhesives having single Tg's in the range of 190° C. to 250° C. which are composition dependent can be made from phenolic-free coating compositions comprising blends of BPADA-SDAN polyetherimide and polyetherimide having condensed BPADA units, 1,3-bis(3,4-dicarboxyphenyl)-1,1,3,3-tetramethyldisiloxane dianhydride (PADS) units and metaphenylene diamine units (m-PDA), or a mixture of (m-PDA) units and para-phenylene diamine (p-PDA) units.

It has been further found that phenolic-free blends of BPADA-m-PDA polyetherimides with polyimides consisting essentially of condensed diamino phenylindane units (DAPI) and benzophenone dianhydride units (BTDA), also have been useful in providing thermoplastics having single Tg's in the range of from 217° C. to 320° C. which are composition dependent and useful as chip adhesives or laminating adhesives in HDI applications.

STATEMENT OF THE INVENTION

There is provided by the present invention, high temperature polyimide compositions comprising condensed units selected from the class consisting of bis(4-aminophenyl)sulfone units, diaminophenylindane units and a mixture thereof, which are capable of providing chip adhesives, laminating adhesives, or film adhesives having a single Tg in the range of 190° C. to 320° C. which are composition dependent and selected from the class consisting of, (A) a blend of BPADA-SDAN polyetherimide and BPDA-SDAN polyimide, (B) an organic solvent solution of a BPDA-SDAN polyimide having a solids content of from about 5% to about 40% by weight, (C) a polyimide blend of BTDA-DAPI and a member selected from the class consisting of BPADA-m-PDA and BPDA-SDAN (D) a blend of a BPADA-SDAN polyetherimide and a BPADA-PADS-m-PDA polyetherimide, or a blend of BPADA-SDAN polyetherimide and a BPADA-PADS-m-PDA-p-PDA polyetherimide.

Monomers which can be used to make the polyimides of the present invention have the following formulas, BPADA, 2,2-bis[4-(3,4-dicarboxyphenoxy)phenyl]propane dianhydride

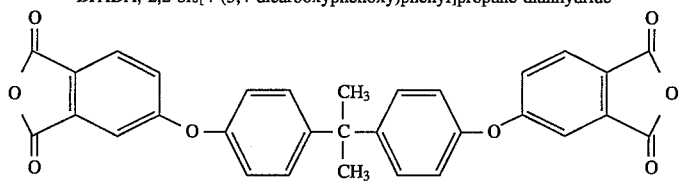

PADS, 2,4-bis[4-(3,4-dicarboxyphenyl)]-2,4-dimethyl-2,4-disila-3-oxapentane dianhydride

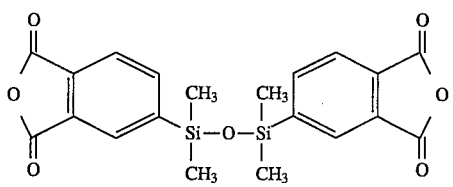

BPDA, 3,3',4,4'-tetracarboxybiphenyl dianhydride

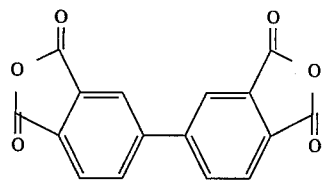

p-PDA, P-phenylenediamine

BTDA, 3,3',4,4'-tetracarboxybenzophenone dianhydride

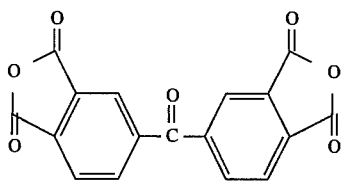

SDAN, bis(4-aminophenyl)sulfone

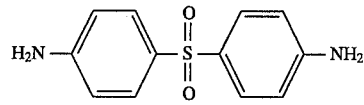

m-PDA, M-phenylenediamine

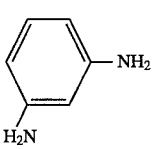

DAPI, 3-(4-aminophenyl-1,1,2-trimethyl-(5- or 6-)aminoindane

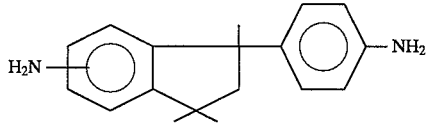

In the practice of one form of the invention, high temperature chip adhesives having Tg's in the range of from 250° C. to 270° C. can be made by treating a substrate with a solution of a blend of BPDA-SDAN polyimide and BPADA-SDAN polyetherimide. There can be used from 1 to 99 parts by weight of the BPDA-SDAN polyimide, per part of the BPADA-SDAN. Solvents can be used to facilitate the application of the blend to the substrate. Suitable solvents are for example, N-methylpyrrolidone, acetophenone, chloroform, p-methylacetophenone and suitable dipolar aprotic solvents.

BPDA-SDAN polyimide can be made by effecting reaction between BPDA and SDAN in combination with phthalic anhydride (PA) as a chain-stopper in the presence of a sodium phenylphosphinate catalyst in a solvent such as orthodichlorobenzene in accordance with the procedure of Peters et al application 07/303,988, filed Jan. 30, 1989 now U.S. Pat. No. 4,965,337, and incorporated herein by reference. Methods for making BPADA-SDAN polyetherimide having an intrinsic viscosity of 0.3 to 0.6 in chloroform at 25° C. are shown by Klopfer, U.S. Pat. No. 4,565,858 incorporated herein by reference by effecting reaction between BPADA and SDAN and phthalic anhydride chain stopper by melt polymerization, or in the presence of an organic solvent, such as orthodichlorobenzene.

Blending of the respective BPDA-SDAN and BPADA-SDAN polyimides can be facilitated by initially using a phenolic solvent, such as meta-cresol, to form a solution of the blend. A clear copolymer film can be obtained by casting a solution of the polyimide blend onto a substrate, such as a glass substrate. The resulting copolymer film can then be redissolved in a dipolar aprotic solvent, such as N-methylpyrrolidone to form a phenolic-free solution which can be applied onto a suitable substrate, such as a ceramic or metal substrate and serve as a chip adhesive. It also has been found that BPDA-SDAN polyimide can be dissolved at concentrations up to 25% by weight in a dipolar aprotic solvent, such as N-methylpyrrolidone. The polyimide can be incorporated into the solvent if it is gradually introduced using small portions.

In order that those skilled in the art will be better able to practice the present invention, the following examples are given by way of illustration and not by way of limitation. All parts are by weight.

EXAMPLE 1

A BPADA-SDAN polyetherimide is prepared in accordance with the teaching of Klopfer, U.S. Pat. No. 4,565,858 by heating a mixture of bisphenol A dianhydride (BPADA)

and bis (4-aminophenyl) sulfone (SDAN), and phthalic anhydride in a Helicone vertical mixer under a nitrogen atmosphere. A polyetherimide is obtained having an intrinsic viscosity of 0.53 in chloroform and a Tg of about 251° C.

Silicone copolymers are made by effecting reaction between equal molar amounts of 1,3-bis(4'-phthalic anhydride) -tetramethyldisiloxane (PADS) and 2,2-bis [4-(3,4-dicarboxyphenoxy) phenyl]propane dianhydride (BPADA) and metaphenylenediamine (m-PDA), or a mixture of equal molar amounts of m-PDA and paraphenylenediamine (p-PDA). A reaction is effected in orthodichlorobenzene in the presence of 0.5 weight % of N,N-dimethylaminopyridine. The resulting silicone copolymers have Tg's of 190° C. and 205° C.

A blend of the BPADA/SDAN polymer and the aforementioned BPADA-PADS-m-PDA silicone copolymers was made utilizing a weight proportion of 9 parts of the BPADA/SDAN per part of the silicone copolymer. Each polymer was blended as a solution in acetophenone, or an acetophenone-p-methylanisole mixture. There were obtained clear homogeneous films when the combined solutions were cast. Following the same procedure, a similar blend was made from BPADA-SDAN and BPADA-PADS-m-PDA-p-PDA. The Tg of the 9 to 1 blends of the BPADA/SDAN and the m-PDA silicone: copolymers was 239° C., while the Tg of the blend of the BPADA/SDAN and the silicone copolymer having both m-PDA and p-PDA units was 242° C. The resulting blends were found useful in HDI applications requiring laminating adhesives having Tg's in the range of 235°–250° C.

EXAMPLE 2

Polyimide having condensed SDAN units and BPDA units was made by heating in a reaction vessel under nitrogen, a mixture of 699.77 grams of 4,4'-bis(2,3-dicarboxyphenoxy) biphenol dianhydride (BPDA), 374.22 grams of 4,4'diaminodiphenyl sulfone (SDAN), 20.11 grams of phthalic anhydride (PA), 0.16 grams of sodium phenylphosphinate and 3000 ml of orthodichlorobenzene. The mixture was refluxed under nitrogen for 3 hours. The product was isolated by precipitation in methanol, filtering and drying.

A 25% solution of the above BPDA-SDAN polyimide in N-methylpyrrolidone was made by incrementally adding a total of 2.5 grams of the polyetherimide to 7.5 grams of N-methylpyrrolidone while stirring and heating to 125°–150° C. The incremental portions of the polymer were added only after the previous portion had dissolved. Otherwise, it was found that the BPDA-SDAN polyimide formed an insoluble cake which remained insoluble if added all at once to the N-methylpyrrolidone. The 25% BPDA-SDAN solution in N-methylpyrrolidone was found to be viscous but still flowable at room temperature. It was found useful if applied as a high temperature chip adhesive useful at temperatures of 270° C. or above.

EXAMPLE 3

Mixtures of BPDA-SDAN polyimide and BPADA-SDAN polyetherimide were prepared by dissolving various ratios of the respective polymers in N-methyl-2-pyrrolidone to produce a total solids content of 10% by weight. Films were cast from the solutions and baked to remove solvent. The final bake-out temperature was 300 C. for 1 hr. The resulting films were used for DSC measurements and determination of Tg. The results are shown below:

| Wt. % BPADA-SDAN in Total Solids | Tg (°C.) |
| --- | --- |
| 0.0 | 270 |
| 25.0 | 264 |
| 50.0 | 260 |
| 75.0 | 254 |
| 100.0 | 250 |

All films were found to be clear and compatible over all concentrations of the two polymers. Organic solvent solutions of the films are useful for forming chip adhesives on a semiconductor substrate.

EXAMPLE 4

A polymer blend containing 25% of BPADA-m-PDA and 75% BPADA-SDAN was prepared by dissolving 2.5 g of the BPADA-m-PDA polymer and 7.5 g of the BPADA-SDAN polymer in 190 g of chloroform. This solution was then precipitated in 1000 ml of acetone, filtered and dried. A total of 9.5 g of polymer blend was isolated. The polymer blend is redissolved in acetophenone, or p-methylacetophenone, for use as a laminating adhesive.

EXAMPLE 5

A 10% acetophenone solution of example 4, was spray coated on to an alumina substrate containing integrated circuit chips. The chips had previously been glued to the alumina substrate using one of the polymer blends from example 3. The thickness of the dried adhesive was about ½ mil. A 1 mil Kapton resin film was then stretched over the substrate and chips and heated to about 300° C. with pressure. The part was cooled to below 200° C. and the pressure removed. The Kapton resin film was laminated to the surface of the substrate and chips. It was ready for additional processing for fabrication of a high density interconnected device.

EXAMPLE 6

Various polymer blends of BTDA-DAPI (sold commercially by Ciba-Geigy Company under the product number XU-218) and BPADA-m-PDA were prepared by dissolving various ratios in acetophenone at 10% concentration by wt. Films were cast, and the solvent baked out. The Tg's of the blends were determined as shown below:

| Wt. % BTDA-DAPI in Total Solids | Tg (°C.) |
| --- | --- |
| 0.0 | 217 |
| 50.0 | 249 |
| 70.0 | 271 |
| 80.0 | 289 |
| 90.0 | 299 |
| 100.0 | 320 |

The polymer blends are found to be compatible at all concentrations and have utility as either chip adhesives or laminating adhesives. In addition these materials are also useful as injection moldable thermoplastics.

EXAMPLE 7

Additional polymer blends were prepared by dissolving various ratios of BPDA-SDAN with BTDA-DAPI in N-methyl-2-pyrrolidone. The blends were heated to 180° C. at a total solids content of 10% by wt. Films were then cast, solvent baked out and the Tg data obtained from DSC measurements.

| Wt. % BTDA-DAPI in Total Solids | Tg (°C.) |
|---|---|
| 0.0 | 270 |
| 20.0 | 280 |
| 50.0 | 298 |
| 100.0 | 320 |

The above polymer blends are found to be particularly useful as chip adhesives for fabricating high density interconnect devices.

Although the above examples are directed to only a few of the very many variables which can be utilized in the practice of the present invention, it should be understood that a much broader variety of chip adhesives, laminating adhesives and film adhesives can be made from polyetherimides and blends as set forth in the description preceding these examples.

What is claimed is:

1. A blend of 2,2-bis[4-(3,4-dicarboxyphenoxy)phenyl] propane/bis(4-aminophenyl) sulfone polyetherimide and 3,3', 4,4'-tetracarboxybiphenyl/bis(4-aminophenyl) sulfone polyimide.

* * * * *